United States Patent
Karri et al.

(10) Patent No.: US 11,736,420 B2
(45) Date of Patent: *Aug. 22, 2023

(54) MANAGEMENT AND ORGANIZATION OF COMPUTER BASED CHAT TYPE CONVERSATIONS

(71) Applicant: International Business Machines Corporation, Armonk, NY (US)

(72) Inventors: Venkata Vara Prasad Karri, Visakhapatnam (IN); Sarbajit K. Rakshit, Kolkata (IN); Sri Harsha Varada, Vizianagaram (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/644,775

(22) Filed: Dec. 16, 2021

(65) Prior Publication Data

US 2023/0198919 A1 Jun. 22, 2023

(51) Int. Cl.
*G06F 15/16* (2006.01)
*H04L 51/02* (2022.01)
*H04L 65/1069* (2022.01)
*G06N 20/00* (2019.01)

(52) U.S. Cl.
CPC ............. *H04L 51/02* (2013.01); *G06N 20/00* (2019.01); *H04L 65/1069* (2013.01)

(58) Field of Classification Search
CPC ...... H04L 51/02; H04L 65/1069; G06N 20/00
USPC ........................................................ 709/204
See application file for complete search history.

(56) References Cited

U.S. PATENT DOCUMENTS

| 8,516,049 | B2 * | 8/2013 | Dholakia | ................ H04L 51/04 |
| | | | | 709/204 |
| 8,767,035 | B2 * | 7/2014 | Baldwin | ................ G10L 15/22 |
| | | | | 348/14.03 |
| 9,172,747 | B2 | 10/2015 | Walters | |
| 9,911,415 | B2 | 3/2018 | Vanblon | |
| 10,419,601 | B2 * | 9/2019 | Katai | .................... H04M 1/724 |
| 10,425,451 | B2 * | 9/2019 | Khan | .................. H04L 65/1045 |
| 10,623,451 | B2 * | 4/2020 | Rathod | ................... H04L 51/04 |
| 10,972,454 | B2 * | 4/2021 | Circosta | ................ H04W 12/02 |

(Continued)

FOREIGN PATENT DOCUMENTS

| CN | 108989190 A | 12/2018 |
| KR | 20210002724 A | 1/2021 |

OTHER PUBLICATIONS

"Resume Conversation after Pause", Rasa Open Source, Rasa Community Forum, Downloaded from the Internet on Aug. 3, 2021, 7 pgs., <https://forum.rasa.eom/t/resume-conversation-after-pause/27075>.

(Continued)

*Primary Examiner* — Moustafa M Meky
(74) *Attorney, Agent, or Firm* — David B. Woycechowsky

(57) ABSTRACT

Computer technology for management and organizing paused and ongoing conversation in an augmented reality (AR) user interface (for example, an interface for products like Google Glass) and for creating a dynamic user interface with the paused and ongoing computer based chat conversations that include: (i) merger of two or more paused conversation content to a single resumed conversation content; and/or (ii) handing over one or more paused conversation to other users.

6 Claims, 2 Drawing Sheets

(56) References Cited

U.S. PATENT DOCUMENTS

| | | | |
|---|---|---|---|
| 11,483,358 B1* | 10/2022 | Walters | G06F 40/279 |
| 11,526,368 B2* | 12/2022 | Karashchuk | G06F 9/453 |
| 11,533,303 B2* | 12/2022 | Circosta | H04L 9/0866 |
| 11,556,230 B2* | 1/2023 | Van Os | G06N 3/04842 |
| 11,587,559 B2* | 2/2023 | Newendorp | H04N 21/41407 |
| 11,658,927 B2* | 5/2023 | Katis | E04H 3/126 |
| | | | 52/1 |
| 11,658,929 B2* | 5/2023 | Katis | H04L 65/764 |
| | | | 52/1 |
| 2005/0210394 A1* | 9/2005 | Crandall | H04L 12/1831 |
| | | | 715/752 |
| 2009/0307319 A1* | 12/2009 | Dholakia | H04L 12/1822 |
| | | | 709/206 |
| 2011/0150198 A1* | 6/2011 | Walsh | H04M 3/56 |
| | | | 379/202.01 |
| 2013/0141516 A1* | 6/2013 | Baldwin | G06F 3/167 |
| | | | 704/E21.001 |
| 2016/0014059 A1* | 1/2016 | Rathod | H04M 1/72484 |
| | | | 715/752 |
| 2017/0359390 A1* | 12/2017 | Khan | H04L 65/403 |
| 2019/0221212 A1 | 7/2019 | Aggarwal | |
| 2019/0372961 A1* | 12/2019 | Circosta | H04L 51/42 |
| 2020/0302926 A1 | 9/2020 | Aggarwal | |
| 2021/0209698 A1* | 7/2021 | Bellingan | G06F 16/958 |
| 2021/0297407 A1* | 9/2021 | Circosta | H04L 63/0421 |
| 2022/0245338 A1* | 8/2022 | Yoo | H04L 12/1813 |
| 2022/0343901 A1* | 10/2022 | Koneru | G06F 8/34 |
| 2023/0077126 A1* | 3/2023 | Circosta | H04L 63/0815 |

OTHER PUBLICATIONS

Schwartz, E., "Google & Apple Hit Pause on Sharing Voice Assistant Recordings with Contractors", Voicebot.ai, Aug. 2, 2019, 10 pgs., <https://voicebot.ai/2019/08/02/google-apple-hit-pause-on-sharing-voice-assistant-recordings-with-contractors/>.

"Operation Method of the Chat Screen", Chat Plus+, Downloaded from the Internet on Nov. 29, 2022, Feb. 2, 2020, 6 pgs., <https://chatplus.jp/support/functional-instructions/how-to-operate-the-chat-screen/?lang=en>.

* cited by examiner

MANAGEMENT AND ORGANIZATION OF COMPUTER BASED CHAT TYPE CONVERSATIONS

BACKGROUND

The present invention relates generally to computer based chats conducted among and between human individuals, chatbots and/or voice assistants.

The Wikipedia entry for "Chatbot" (as of Aug. 4, 2021) states, in part, as follows: "A chatbot is a software application used to conduct an on-line chat conversation via text or text-to-speech, in lieu of providing direct contact with a live human agent. Designed to convincingly simulate the way a human would behave as a conversational partner, chatbot systems typically require continuous tuning and testing, and many in production remain unable to adequately converse or pass the industry standard Turing test. The term "Chatter-Bot" was originally coined by Michael Mauldin (creator of the first Verbot) in 1994 to describe these conversational programs. Chatbots are used in dialog systems for various purposes including customer service, request routing, or information gathering. While some chatbot applications use extensive word-classification processes, natural language processors, and sophisticated AI, others simply scan for general keywords and generate responses using common phrases obtained from an associated library or database. Most chatbots are accessed on-line via website popups or through virtual assistants. They can be classified into usage categories that include: commerce (e-commerce via chat), education, entertainment, finance, health, news, and productivity." (footnote(s) omitted)

SUMMARY

According to an aspect of the present invention, there is a method, computer program product and/or system that performs the following operations (not necessarily in the following order): (i) conducting a first computer based chat session among a first plurality of chat participants; (ii) conducting a second computer based chat session among a second plurality of chat participants; (iii) pausing the first computer based chat session; (iv) pausing the second computer based chat session; and (v) subsequent to the pause of the first and second computer based chat sessions, initiating a third computer based chat session among a third plurality of chat participants, with the third chat session being a merger of a plurality of computer based chat sessions including the first computer based chat session and the second computer based chat session.

According to an aspect of the present invention, there is a method, computer program product and/or system that performs the following operations (not necessarily in the following order): (i) conducting a first computer based chat session among a first plurality of chat participants; (ii) pausing the first computer based chat session; and (iii) initiating a second computer based chat session among a second plurality of chat participants, with the second chat session being a continuation of the first computer based chat session, and with the second plurality of chat participants including at least one chat participant that is not included in the first plurality of chat participants.

According to an aspect of the present invention, there is a method, computer program product and/or system that performs the following operations (not necessarily in the following order): (i) conducting a first computer based chat session among a first plurality of chat participants; (ii) conducting a second computer based chat session among a second plurality of chat participants; (iii) pausing the first computer based chat session; (iv) pausing the second computer based chat session; and (v) subsequent to the pause of the first and second computer based chat sessions, initiating a third computer based chat session among a third plurality of chat participants, with the third chat session being a merger of the first computer based chat session and the second computer based chat session, and with and with the third plurality of chat participants including at least one chat participant that is not included in the first plurality of chat participants and also not included in the second plurality of chat participants.

DETAILED DESCRIPTION

Figure 1:
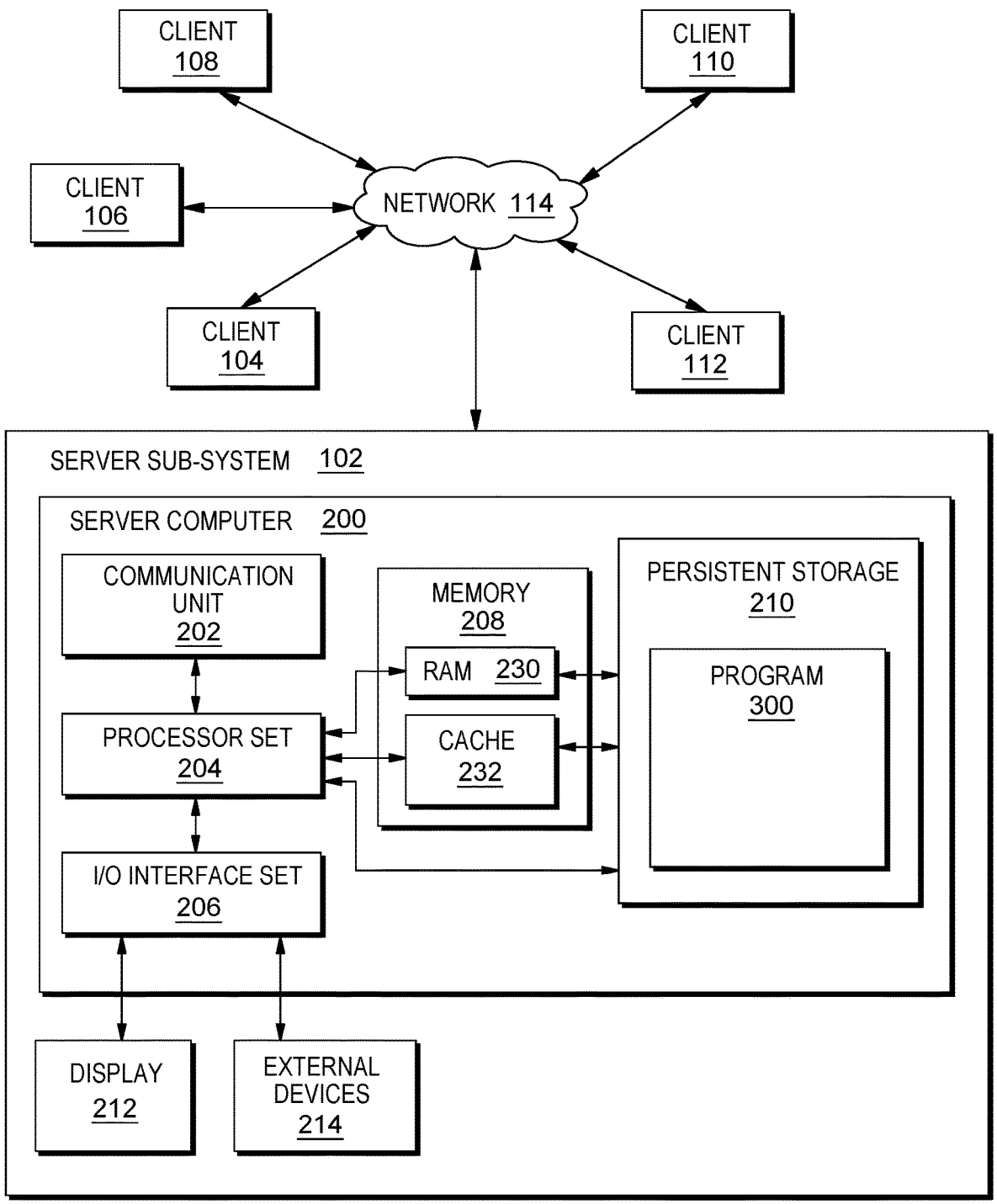
FIG. 1 is a block diagram view of a first embodiment of a system according to the present invention.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
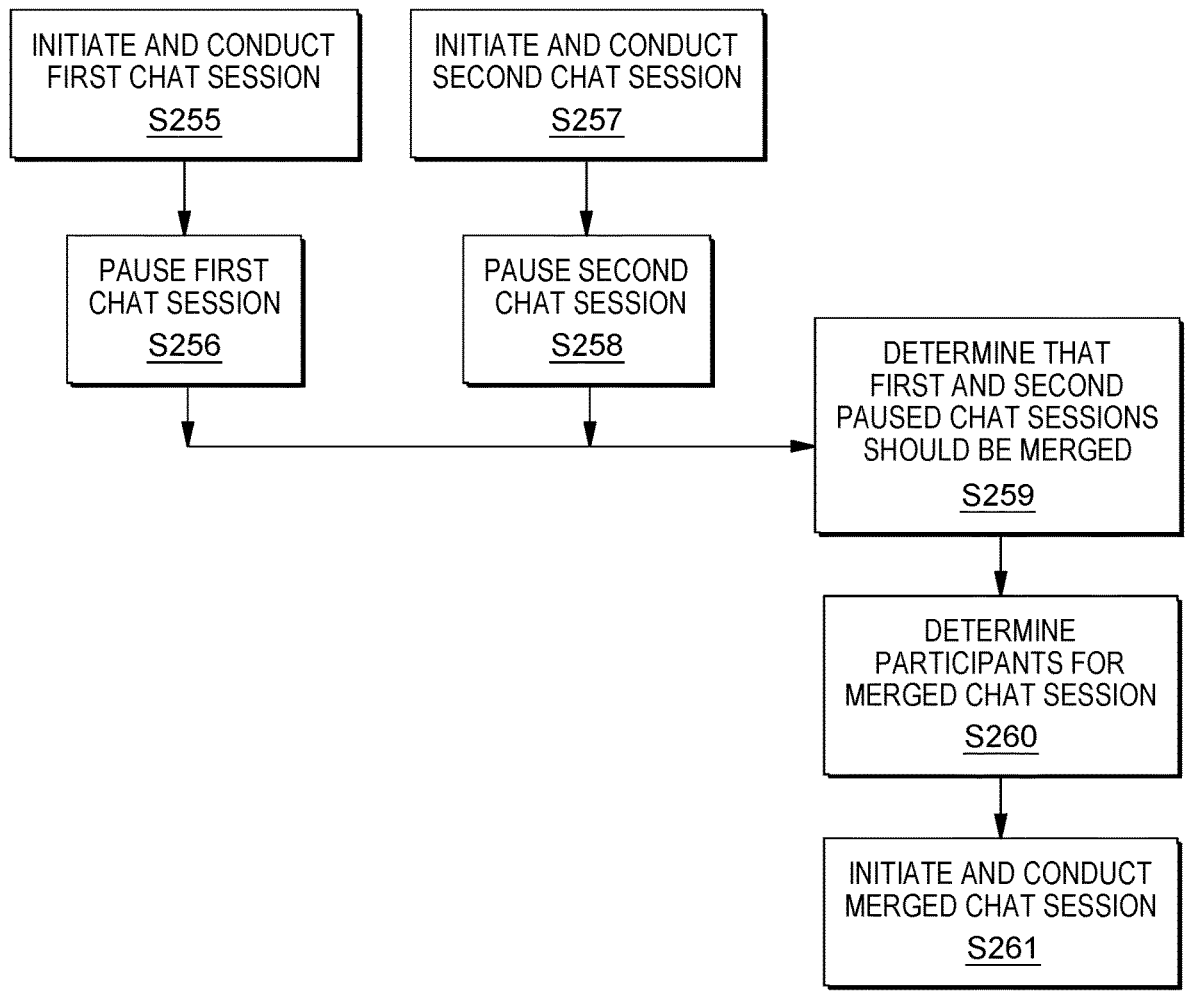
FIG. 2 is a flowchart showing a first embodiment method performed, at least in part, by the first embodiment system.
Figure 3:
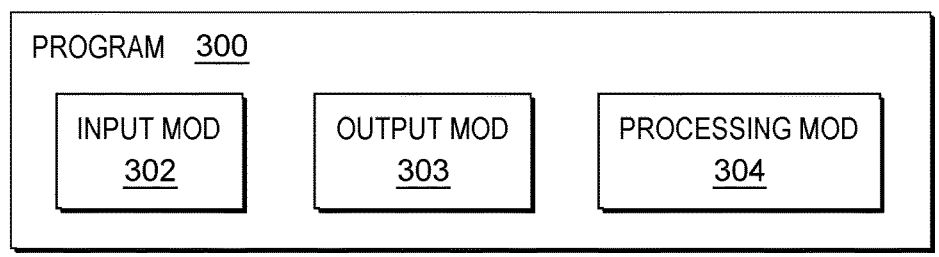
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where processing module ("mod") 304 initiates and conducts a first computer based chat session among a first plurality of chat participants. In this example, the participants in the chat are as follows: (i) a first human individual who uses client subsystem 104 (in this example, the smartphone of the first human individual); (ii) a chatbot hosted and implemented by client subsystem 106 (in this example, subsystem 106 is a chatbot server); and (iii) a virtual assistant hosted and implemented by client subsystem 108 (in this example, the virtual assistant is intermittently improved by the processes of machine learning and artificial intelligence).

Processing proceeds to operation S256, where: (i) input module ("mod") 302 receives a request to pause the first computer based chat session; and (ii) responsive to the receipt of the request, mod 304 pauses the first computer based chat session.

Another thread of the method of flowchart 250 begins at operation S257, where processing module ("mod") 304 initiates and conducts a second computer based chat session among a second plurality of chat participants. In this example, the participants in the chat are as follows: (i) a second human individual who uses client subsystem 110; (ii) a chatbot hosted and implemented by client subsystem 112 (in this example, subsystem 112 is another chatbot server); and (iii) the virtual assistant hosted and implemented by client subsystem 108. Processing on this thread proceeds to operation S258, where: (i) mod 302 receives a request to pause the second computer based chat session; and (ii) responsive to the receipt of the request, mod 304 pauses the second computer based chat session. In this example, the first and second chat sessions occur at substantially the same time. Alternatively, one of the chats may occur before the other.

Both threads converge at operation S259, where mod 304 determines that the first and second chat sessions should be merged. In this example, this determination is made based on a request to merge the paused chat sessions that is received from the virtual assistant of client subsystem 108. Alternatively, this determination to merge the chats could be made by the machine logic of processing mod 304 based on various factors, such as the subject matter similarity of the two chats. In this example, only two chats are merged. Alternatively, more than two chats may be merged.

Processing proceeds to operation S260, where mod 304 determines the participants for the merged chat session (sometimes herein referred to as the "third chat session"). In this example, this participants are determined based on a request for a selected set of participants that is received from the virtual assistant of client subsystem 108. Alternatively, this determination to merge the chats could be made by the machine logic of processing mod 304 based on various factors. In this example, the participants for the merged chat are as follows: (i) the first human individual who uses client subsystem 104; (ii) the second human individual who uses client subsystem 110; and (iii) the virtual assistant at client subsystem 108. In this example, the virtual assistant has decided that participation of the chatbots are hindering, rather than helping their respective conversations, and also that each of the human participants could potentially benefit from participation of the other human individual.

Processing proceeds to operation S261, where subsequent to the pause of the first and second computer based chat sessions, processing mod 304 and output mod 303 initiate the third computer based chat session among a third plurality of chat participants as determined at previous operation S260. The third chat session is a merger of the first computer based chat session and the second computer based chat session. In this example, the third plurality of participants only includes participants that were involved in the first paused chat, the second paused chat or both of the first and second paused chats. Alternatively, the third plurality of chat participants may include at least one chat participant that is not included in the first plurality of chat participants and also not included in the second plurality of chat participants.

III. Further Comments and/or Embodiments

Some embodiments of the present invention recognize the following facts, potential problems and/or potential areas for improvement with respect to the current state of the art: (i) an AI (artificial intelligence) voice assistance system, like Amazon Alexa, Google Home, can receive voice command and either execute the voice command or reply to the user with voice response; (ii) the user can perform various activities with the AI voice assistance system, such as a conversation with a remote travel system, shopping system, etc.; and/or (iii) some of the discussions can be long running discussions that include negotiation, discussion, etc.

Some embodiments of the present invention recognize the following facts, potential problems and/or potential areas for improvement with respect to the current state of the art: (i) where using an AI voice assistance system: (a) if the user wants to pause any conversation with a remote AI system and, at later point of time, if the user wants to resume the said conversation and wants to start the conversation where it was paused previously, then the conversation session needs to be reopened; (ii) can refer to any other previous conversation; and/or (iii) what is needed is a method and system by which the user can select an appropriate voice conversation session.

Some embodiments of the present invention may include one, or more, of the following operations, features, characteristics and/or advantages: (i) using AR (augmented reality) enabled AI voice assistance system, the user can select any paused conversation or refer to any previous conversation, and include the same in a current interaction or resume the paused conversation; (ii) the system can be used dynamically as and when needed; and/or (iii) using an AR enabled AI voice assistance system, the user can select any paused conversation or refer any previous conversation, and include the same in current interaction or resume the paused conversation.

Some embodiments of the present invention may include one, or more, of the following operations, features, characteristics and/or advantages: (i) while having voice interaction with an AI voice assistance system on any topic, a user can pause or stop any ongoing conversation topic without arriving at any conclusion, and at later point of time, the said user can resume the paused conversation and arrive at conclusion (for example, you're planning to travel, so he/she is discussing what hotel service provider to use, and before finalizing the decision, the user can pause or stop the conversation, and later the user can resume the conversation and finalize the decision); (ii) an AI voice assistance system will be paired with AR glasses, and can visualize the paused conversation topics; (iii) can visualize what are the pending conversation topics and what is discussed; and/or (iv) the AI voice assistance system will be keeping the conversation session active until the time the conclusion is made, and using AR glasses, the user can select the required active session and resume the conversation (such as a hotel booking conversation topic is paused, so using AI glasses, the user can visualize what are the pending topics are and what is discussed).

Some embodiments of the present invention may include one, or more, of the following operations, features, characteristics and/or advantages: (i) using AR glasses, the user can select one or more active conversation topics; (ii) the said selected active conversation topic contents can be merged and a single multi-party conversation topic can be created so that the user can perform a consolidated conversation on multiple topic together (for example, the user can select a few paused conversation topics, such as hotel booking, flight booking, shopping system and bring everybody together and resume the conversation); and/or (iii) using AR glasses, the user can hand over one paused or ongoing conversation topic with the AI voice assistance system to another user, and accordingly, the receiving user will be able to perform the conversation on the partially discussed topic (for example, the pause hotel discussion topic has been handed over to another user).

Some embodiments of the present invention may include one, or more, of the following operations, features, characteristics and/or advantages: (i) while having a conversation with the AI voice assistance system on any topic, the AR glasses of the user will be analyzing the current conversation content and will identify what were the previous conversation on the same or similar topic in the past; (ii) the historical conversation topic can be identified from the user or the users friend, who has allowed the user to access their past conversation, and the user will recommend what types of questions are to be asked, etc. (for example, when the user is performing a conversation with the AI voice assistance system on booking a hotel, the AR glasses will show historical conversation topics and recommends questions to be asked); and/or (iii) while performing any interaction with an AI voice assistance system on any topic, the user can refer to any historical conversation, and accordingly the system will consider the referred conversation content and will include the same in current conversation (for example, the user is planning a vacation, so while having a discussion with the current conversation, the user can select any past conversation content as a reference).

Some embodiments of the present invention may include one, or more, of the following operations, features, characteristics and/or advantages: (i) the user should be able to extract key tokens from different conversations that happened with the voice assistant using NLP (natural language processing) query commands and share them to another conversation seamlessly using AR interaction (for example, if the user is booking travel insurance, where he/she need to provide his flight and hotel itinerary details, he/she can pick the booking ID (identification), etc., as key tokens from previous conversations and provide it to the current conversation using AR); (ii) the system will create new action based conversations for pre-requisite and parallel activities, where the user can simply ask the voice assistant to perform all pre-requisites and the system would act on his behalf and then call him for the conversation (as an example in this case, it will frame a pleasing message to send to a professor, auto-cancel a gas order and auto-book pet care, and when all pre-requisites are done, the voice assistant will resume the conversation); and/or (iii) covers the aspects of managing multiple pause and resume conversations and interact with them in an AR view, where the user can handle multiple conversations seamlessly.

As an example of how paused conversations can be managed, the following is an example of text presented to a user in order to facilitate use and/or resumption of paused conversations:
TOPIC HOTEL BOOKING: (i) discussed: (a) location, (b) food, and (c) facilities; and (ii) pending: (a) any offer can be presented, (b) duration of stay, and (c) total bill.
TOPIC TRAVEL INSURANCE: (i) discussed: (a) travel location, and (b) duration of stay; and (ii) pending: (i) travel insurance discount, and (b) clauses.

A method according to an embodiment of the present invention includes the following operations (not necessarily in the following order): (i) while having interaction with an AI voice assistance system, the said AI voice assistance system can connect to a remote AI system to have a voice conversation; (ii) while having interaction with an AI voice assistance system, the AI voice assistance service provider will capture the conversation topic; (iii) the conversation topic means the question from the user and also the reply from the remote AI system; (iv) the conversation topic will analyzed to identify if the conversation is concluded, or any decision is reached; (v) based on historical analysis of the concluded conversation, the system will identify if the conversation is concluded; and (vi) based on the current state of the conversation, and the pattern of historically captured concluded contents, the system will identify what are the pending discussion topics.

A method according to an embodiment of the present invention includes the following operations (not necessarily in the following order): (i) while having a conversation, the user may not conclude the conversation, and pause or stop the conversation in between; (ii) the system will identify which conversations are concluded, and which are not concluded; (iii) based on the conversation content, the system will identify the topic of conversation; (iv) for the paused conversation, the system will identify what discussions are still pending, and it will be identified based on the users historical interaction; (v) if any conversation topic is partially finished, the system will keep the conversation content active and the user can resume at any point in time; and (vi) using AR glasses, the user can visualize which conversation topics are partially completed and which are completely completed.

A method according to an embodiment of the present invention includes the following operations (not necessarily in the following order): (i) the user can select any conversation topic which is not concluded, and accordingly, the user can visualize what is discussed and what is pending; (ii) the user can resume the conversation from the point where it was resumed and can perform a voice conversation; (iii) using AR glasses, the user can transfer any conversation content to another user where the conversation has not concluded; (iv) upon receiving the conversation, another user can initiate the conversation and arrive at the conclusion; (v) using AR glasses, the user can select multiple conversation contents which are not concluded and initiate a group conversation; (vi) while having a group conversation, the multiple conversation content will be considered, and the user can resume discussions together; (vii) while having any discussion, the system will identify what topic is being discussed, and can visualize any previous discussion on the topic, where the AR glasses will show the recommended questions that are to be asked; and (viii) while having a discussion, the user can select any past conversation as reference and accordingly, can continue to discuss the current topic.

Some embodiments of the present invention may include one, or more, of the following operations, features, characteristics and/or advantages: (i) using an AR enabled AI voice assistance system, the user can select any paused conversation or refer any previous conversation, and include the same in the current interaction or resume the paused conversation; (ii) while having voice interaction with an AI voice assistance system on any topic, the user can pause or stop any ongoing conversation topic without arriving at any conclusion, and at a later point of time, the said user can resume the paused conversation and arrive at a conclusion; (iii) in this case outlined in item (i) and item (ii) above, the AI voice assistance system will be paired with AR glasses, and the user can visualize the paused conversation topics, and can visualize what the pending conversation topics are and what is discussed; and/or (iv) the AI voice assistance system will keep the conversation session active until the time the conclusion is made, and using AR glasses, the user can select the required active session and resume the conversation.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
   conducting a plurality of historical computer based chat sessions among at least some of a plurality of historical chat participants including, in each historical computer based chat session, a first participant;
   for each given historical chat session of the plurality of chat sessions, classifying the chat session as involving a first topic;
   conducting a current computer based chat session with the current computer based chat session including the first participant;
   analyzing content of the current chat session to determine that the current chat session involves a first topic;
   responsive to the determination that the current computer based chat session involves the first topic, creating a listing of historical computer based chat sessions that involved the first topic;
   during the current computer based chat session, displaying to the first participant the listing of historical computer based chat sessions that involved the first topic;
   during the current computer based chat session, receiving first user input from the first participant, with the first user input being indicative of a selection of a selected historical computer based chat session from the listing; and
   during the current computer based chat session, merging the selected historical computer based chat session into the current computer based chat session.

2. The CIM of claim 1 wherein the displaying of listing is presented through an augmented reality (AR) display device of the first participant.

3. A computer program product (CPP) comprising:
   a set of storage device(s); and
   computer code stored collectively in the set of storage device(s), with the computer code including data and instructions to cause a processor(s) set to perform at least the following operations:
   conducting a plurality of historical computer based chat sessions among at least some of a plurality of historical chat participants including, in each historical computer based chat session, a first participant,
   for each given historical chat session of the plurality of chat sessions, classifying the chat session as involving a first topic,
   conducting a current computer based chat session with the current computer based chat session including the first participant,
   analyzing content of the current chat session to determine that the current chat session involves a first topic,
   responsive to the determination that the current computer based chat session involves the first topic, creating a listing of historical computer based chat sessions that involved the first topic,
   during the current computer based chat session, displaying to the first participant the listing of historical computer based chat sessions that involved the first topic,
   during the current computer based chat session, receiving first user input from the first participant, with the first user input being indicative of a selection of a selected historical computer based chat session from the listing, and
   during the current computer based chat session, merging the selected historical computer based chat session into the current computer based chat session.

4. The CPP of claim 3 wherein the displaying of listing is presented through an augmented reality (AR) display device of the first participant.

5. A computer system (CS) comprising:
   a processor(s) set;
   a set of storage device(s); and
   computer code stored collectively in the set of storage device(s), with the computer code including data and instructions to cause the processor(s) set to perform at least the following operations:
   conducting a plurality of historical computer based chat sessions among at least some of a plurality of historical chat participants including, in each historical computer based chat session, a first participant,
   for each given historical chat session of the plurality of chat sessions, classifying the chat session as involving a first topic,
   conducting a current computer based chat session with the current computer based chat session including the first participant,
   analyzing content of the current chat session to determine that the current chat session involves a first topic,
   responsive to the determination that the current computer based chat session involves the first topic, creating a listing of historical computer based chat sessions that involved the first topic, during the current computer based chat session, displaying to the first participant the listing of historical computer based chat sessions that involved the first topic, during the current computer based chat session, receiving first user input from the first participant, with the first user input being indicative of a selection of a selected historical computer based chat session from the listing, and during the current computer based chat session, merging the selected historical computer based chat session into the current computer based chat session.

6. The CS of claim 5 wherein the displaying of listing is presented through an augmented reality (AR) display device of the first participant.

\* \* \* \* \*